Figure 1:
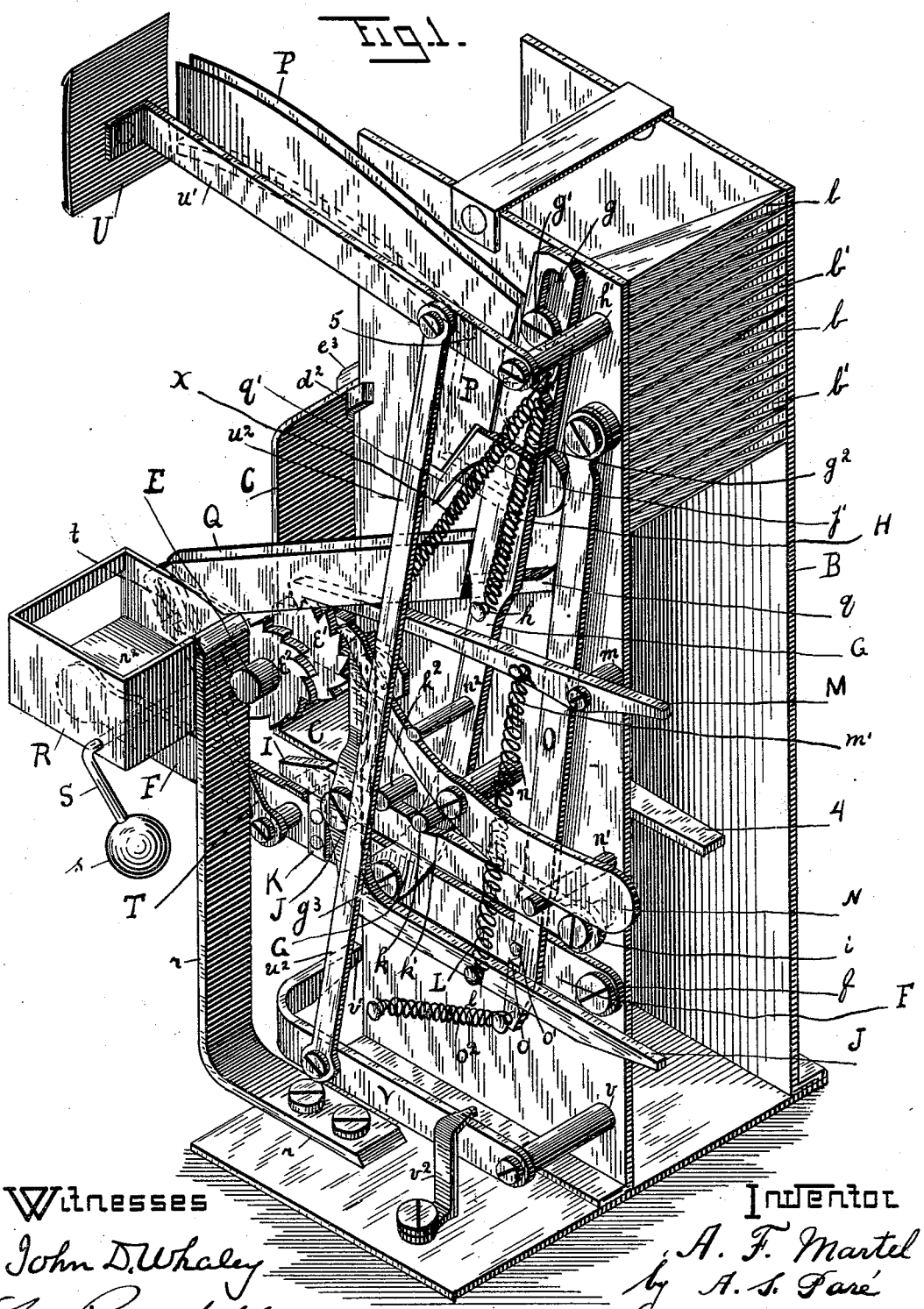

(No Model.) 5 Sheets—Sheet 1.

A. F. MARTEL.
APPARATUS FOR AUTOMATICALLY DELIVERING GOODS.

No. 517,412. Patented Mar. 27, 1894.

Witnesses
John D. Whaley
M. Rosenfeld

Inventor
A. F. Martel
by A. S. Paré
Attorney (No Model.)  5 Sheets—Sheet 2.
A. F. MARTEL.
APPARATUS FOR AUTOMATICALLY DELIVERING GOODS.
No. 517,412.  Patented Mar. 27, 1894.
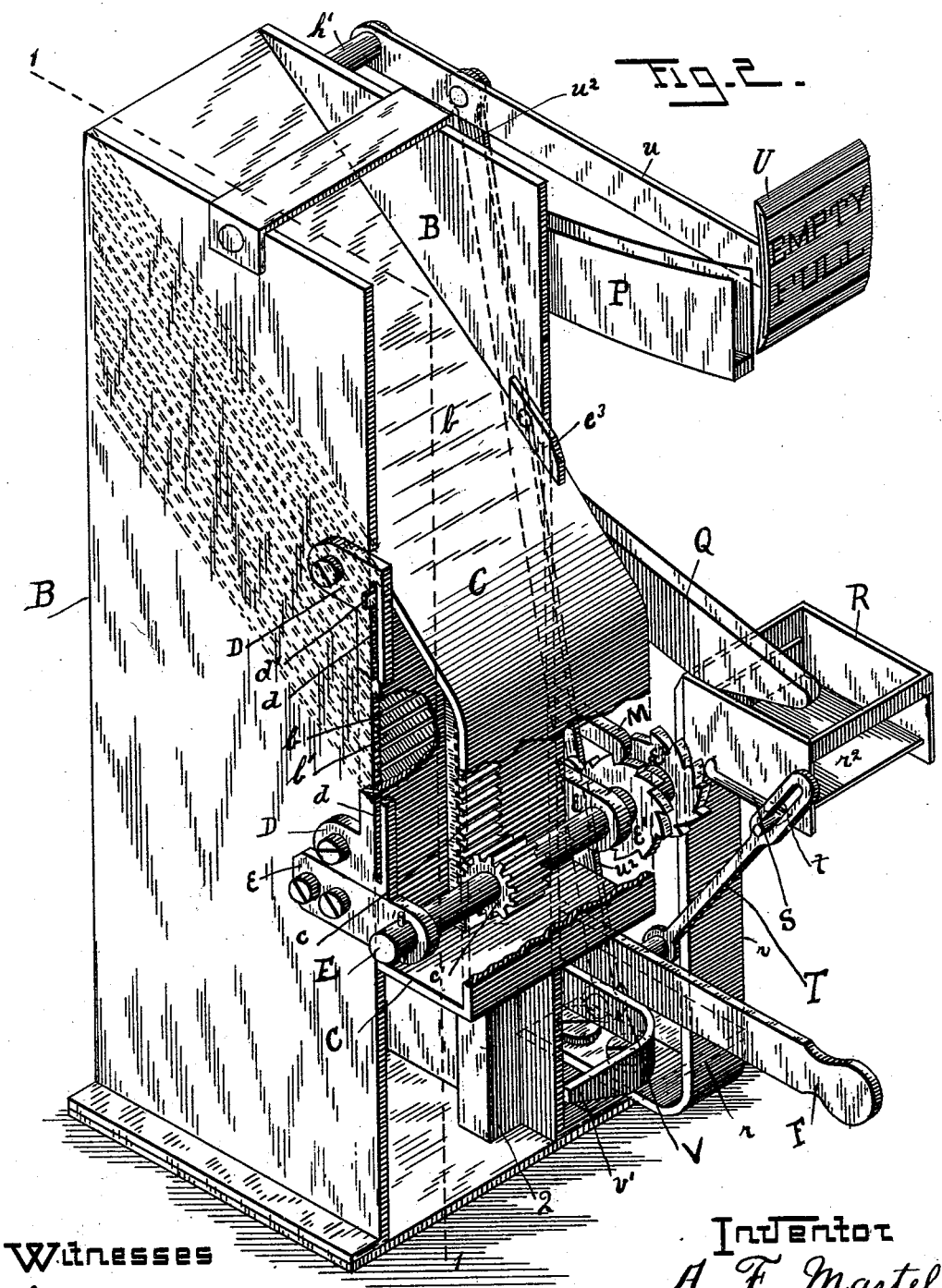

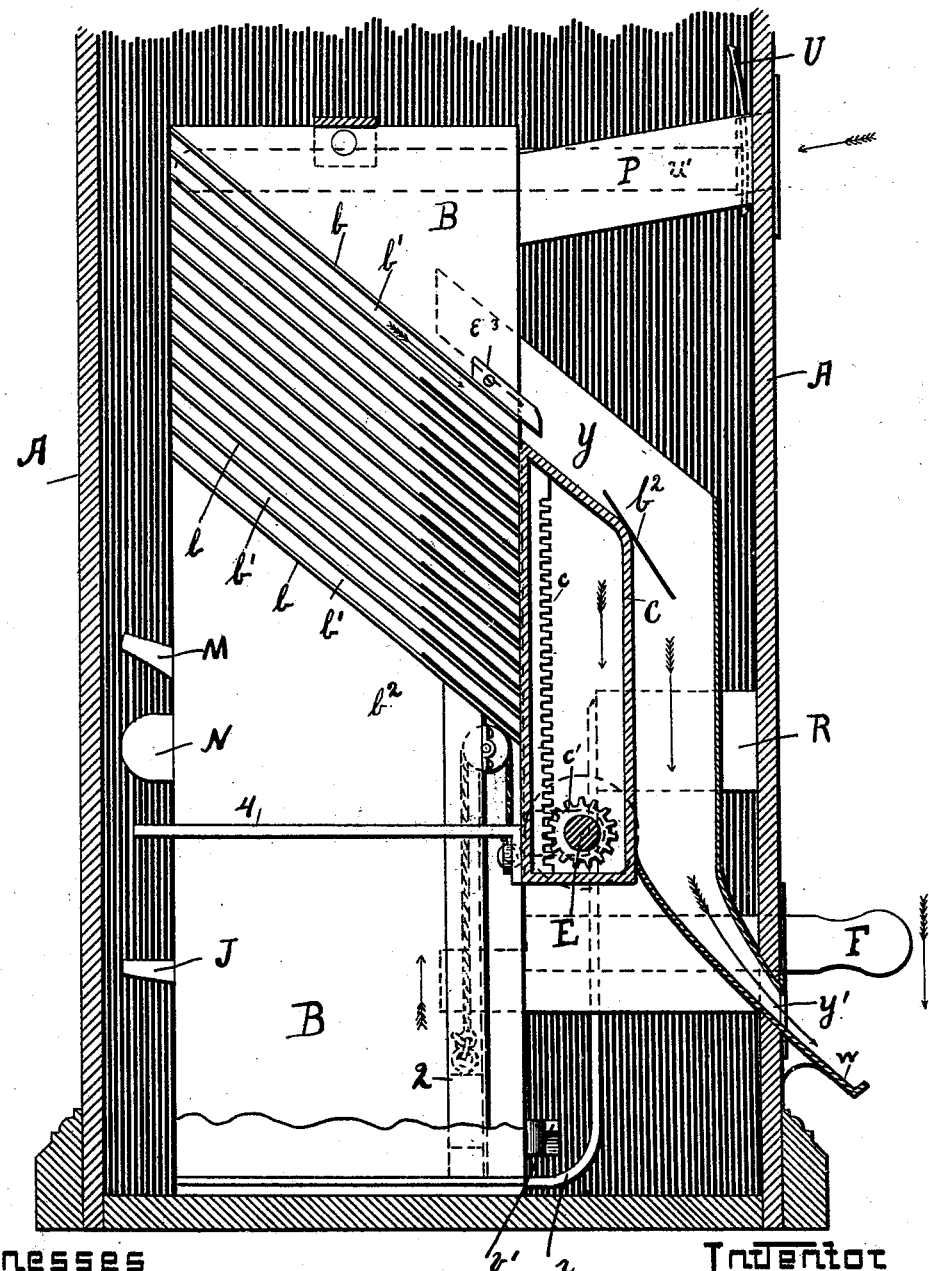

(No Model.)  5 Sheets—Sheet 4.
A. F. MARTEL.
APPARATUS FOR AUTOMATICALLY DELIVERING GOODS.
No. 517,412. Patented Mar. 27, 1894.
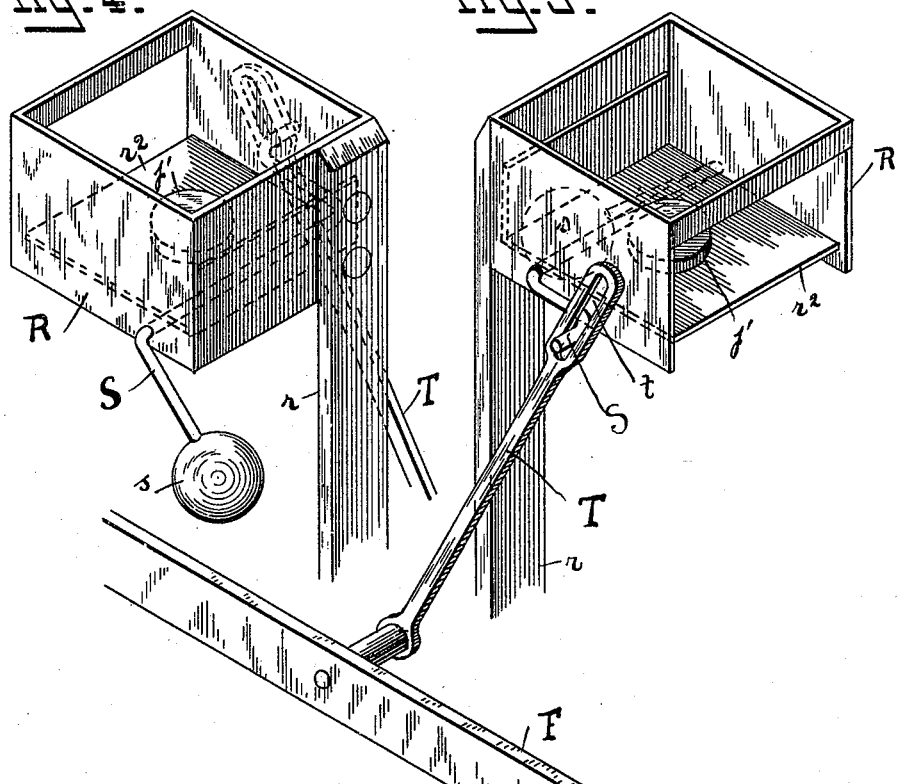

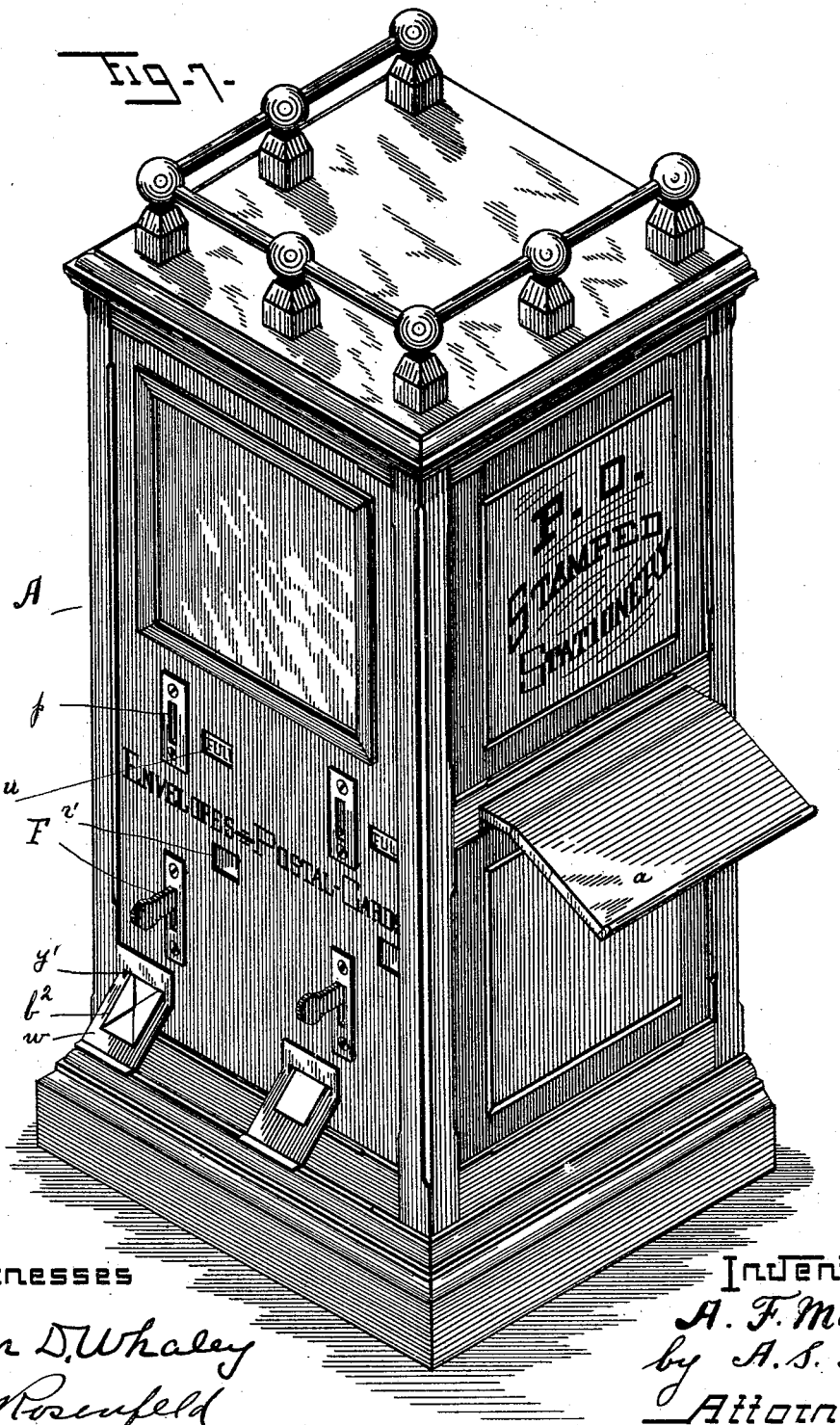

UNITED STATES PATENT OFFICE.

ADELARD F. MARTEL, OF SAN FRANCISCO, CALIFORNIA, ASSIGNOR OF ONE-HALF TO FRANK PEARSON LOWELL, OF SAME PLACE.

APPARATUS FOR AUTOMATICALLY DELIVERING GOODS.

SPECIFICATION forming part of Letters Patent No. 517,412, dated March 27, 1894.

Application filed June 15, 1892. Serial No. 436,881. (No model.)

*To all whom it may concern:*

Be it known that I, ADELARD FRANCIS MARTEL, a subject of the Queen of Great Britain, and a resident of San Francisco, in the State of California, have invented a new and useful Apparatus for Automatically Delivering Goods, &c.; and I do hereby declare that the following is a full, clear, and exact description of said invention, such as will enable others skilled in the art to which it most nearly appertains to make, use, and practice the same.

The object of my invention is to provide a simple, and convenient apparatus whereby the public may obtain automatically a certain amount of prepared goods by means of a small coin.

My invention relates to that class of machines so well known in the United States as "nickel-in-the-slot" machines for the delivering of prepared goods. In general however I shall in the following description refer to a machine specially adapted to the delivery of stamped stationery, or newspapers.

To these ends my invention consists in the improved construction and arrangement of parts which will be hereinafter fully described and particularly pointed out in the claims.

Referring to the drawings hereto annexed being made in five sheets, and drawn mostly in isometrical perspective Figure 1, is a view looking from the rear left hand corner of my mechanism. Fig. 2, is a view looking from the front left hand corner of my mechanism with a portion broken away. Fig. 3, is a vertical section of my mechanism taken from line 1, 1, Fig. 2, with a portion of the left hand side broken away, also showing a section of the frame or box in which I propose to inclose my mechanism. Figs. 4, 5, and 6 are detailed views of parts of my mechanism. Fig. 7, is a view showing partly a double completed mechanism ready for operation.

The letter A is used to denote the box, in which I propose to inclose my mechanism, shown in Figs. 3, and 7. This box is provided with a semi-inclined board $a$ shown in Fig. 7, which may be used by the public as writing-desk, also provided with apertures which will be fully described hereinafter.

B designates the inside frame, constructed of any suitable material preferably of thin plate of iron, to which the different parts of my invention are held in position, shown in Figs. 1, 2, and 3. Placed within frame B, and may be connected thereto in any suitable manner is a series of stationary inclined shelves $b$ shown in Figs. 1, 2, and 3 arranged so as to form receptacles $b'$ between each of them for the insertion of stamped stationery as more particularly shown in Fig. 3. These receptacles $b'$ may be made of any shape or size according to the prepared goods to be inserted therein; $b^2$ shown only in Figs. 3, and 7 is intended for stamped envelopes.

C is a sliding board, or box inclined at its upper part to correspond to shelves $b'$ and held loosely to the front part of frame B immediately opposite the front or discharge end of the receptacles $b'$ shown in Figs. 1, 2 and 3 and slide downward while in operation, by means of rack $c$ placed within said box, and may be secured thereto in any suitable manner also pinion $c'$ plainly shown in Figs. 2, and 3.

D is a guide attached to the frame B shown in Fig. 2; $d$ a slot cut within said guide into which a small projection $d'$ is secured to the box C to slide freely and prevent thereby the box from shifting out while in operation; $d^2$ is an additional guide attached also to said box, and it slides along the outer side of frame B shown only in Fig. 1.

E is a shaft for the pinion $c'$ held in proper place by brackets $e$ which are screwed or may be bolted to the outer side of frame B. Placed at one end of said shaft, and forming part thereof are two toothed wheels $e'$ $e^2$ which are at a certain distance apart, and the teeth of said wheels are respectively in opposite directions as plainly shown in Figs. 1, and 2.

$e^3$ is a stopper attached within frame B, and immediately above the first shelf $b$ as shown in Figs. 1, 2, and 3, to prevent the box C from going farther up than necessary.

F is a reciprocating lever fully illustrated in Fig. 1, and partly in Figs. 2, 3, 5, and 7. This lever is pivoted at its rear end to the frame B as at $f$, shown only in Fig. 1, the front end of which extends through and outwardly from the box A particularly shown in Figs. 3, and 7. About one third of the way down from the rear end of said lever, is a connecting rod or flat bar G shown only in Fig. 1, and it may be pivoted thereto in any suitable manner. This bar extends almost vertically toward the upper part of the frame B where it is slotted as at $g$.

$g'$ is a flat head screw or pin passing through the slot $g$ and secured to the frame B in such manner as to permit said bar G to oscillate and slide freely up, and down whenever lever F is in operation.

It will be seen by looking over Fig. 1, that the upper part of bar G is made in two pieces, one fastened against the other so as to form a shoulder beneath as at $g^2$ and space between said bar or rod below the shoulder $g^2$ and the frame B which may be continued down so that the inner side will come even with the outer side of lever F where it is pivoted as at $g^3$. However it will be the same if the bar G is made in one piece and bent below the slot $g$ so as to form the shoulder $g^2$ and the space as above mentioned. The object of said bar G with shoulder $g^2$ and the space will be hereinafter described.

H is a coil spring the lower end of which is attached to the bar G as at $h$, while the upper end is attached to an independent post $h'$ secured to the frame B, or it may be attached directly to said frame if desired. This spring H serves to draw backward bar G, and to carry up at the same time lever F after the latter has been pushed downward to set my mechanism in motion.

I is a horizontal lever the rear end of which is pivoted to the frame B as at $i$ in such manner as to permit an oscillating movement. This lever I extends across the side of frame B and near its front end at right angle is a pawl J which may be pivoted thereto in any suitable manner so as to be capable of a vertical oscillating, and up and down movement while lever I is in operation. This pawl engages with the teeth of ratchet wheel $e'$ and serves to revolve said wheel when required while the lower part of said pawl projects downward below its pivoted point and thence backward toward the rear end of frame B as plainly shown in Fig. 1.

K is a support secured to the middle of the reciprocating lever F, or it may be placed at any other suitable part of said lever, and projects vertically, the upper part of which is bent at right angles so as to form a rest for the lever I, as shown only in Fig. 1, and serves to raise said lever.

$k$ is a pin or post secured to the bar G, and projects immediately outwardly above the notch $k'$ cut upon the upper edge of lever I, and serves to carry said lever downward while lever F is in operation thereby causing the wheel $e'$ to revolve; $k^2$ is another pin or post secured to the frame B, and projects immediately outwardly above lever I, and serves as a stopper to prevent said lever from going farther up than required. These two pins or posts are shown only in Fig. 1.

L is a vertical spring, the lower end of which is attached at about the middle of the horizontal part of the pawl J as at $l$ and serves to keep constantly said pawl upon the teeth of wheel $e'$ as shown in Fig. 1, while the upper end of said spring may be attached, or secured to the frame B in any suitable manner.

M is a pawl extending across frame B and engaging with the teeth of wheel $e'$ as shown in Figs. 1, and 2, for preventing the backward motion of said wheel. This pawl M, is pivoted to the frame B near its rear end, as at $m$ shown in Fig. 1, in such manner as to permit a horizontal oscillating movement when in operation.

$m'$ is a vertical spring the upper end of which is attached to pawl M, while the lower end may be secured to the frame B, and serve to keep the front end of said pawl constantly upon the wheel $e'$.

I have shown in the drawings that spring $m'$, and L are the same as I have found that it is more convenient, and cheaper to construct this part of my invention in such manner.

N is an additional pawl extending across frame B, and pivoted thereto at about its middle as at $n$ shown in Fig. 1, in such manner as to permit a balancing motion to said pawl—the front end of which engages into the teeth of wheel $E^2$ and prevents said wheel from revolving more than a certain space, while my mechanism is in operation. The rear end is made heavier than the front end so as to carry the front end out of the way from the teeth of wheel $E^2$ when required.

$n'$ is a pin or post secured to the frame B near its rear part upon which the rear end of pawl N rests when not in operation. $n^2$ is another pin or post secured to the connecting bar G above pawl N as shown, and projects over said pawl N. When the bar G is moved downward by means of lever F the pin $n^2$ will strike the upper edge of pawl N between its pivot $n$, and the front end, and carry down the front part of said pawl to the wheel $e^2$ thereby obtaining the result above mentioned.

O is a vertical bar for the purpose of locking my apparatus when required and for preventing any one from setting my machine in operation without the insertion of a nickel or coin. This bar is pivoted at or near its upper end to the frame B in such manner as to permit an oscillating movement when required. The lower end of said bar passes close to or over lever F between bar G and pivot $f$, and projects below said lever as shown in Fig. 1; $o$ is a rectangular cut or recess made within the left hand side of said bar O, immediately near or opposite the middle of lever F.

$o'$ is an intercepting pin secured to lever F and extending through the recess $o$ as shown in Fig. 1. The object of said pin is to prevent any one from moving downward lever F and setting my mechanism in motion without the use of means more fully hereinafter described to throw out of the way bar O. As long as this bar O remains in its present position as shown the intercepting pin will always strike the lower edge of recess o and thereby stop the lever from going down which movement would otherwise set my mechanism in motion.

$o^2$ is a spring attached to the lower end of bar O while the other end is secured to the frame B at any suitable place. The object of this spring is to draw said bar constantly against pin $o'$, and keep it in this position until the bar is forced out of the way by other means—thereby obtaining the desired result.

P is an inclined conduit through which the nickel slides or rolls down toward the interlocking bar O, fully illustrated in Fig. 1 and partly in Figs. 2, and 3. This conduit extends from the inner side of frame A as shown in Fig. 3, where it is connected to the aperture p cut through said frame shown in Fig. 7, thence it extends across frame B to bar G as shown in Fig. 1, thence downward alongside of said bar where the end of said conduit partly projects beneath the shoulder $g^2$ as shown in dotted lines Fig. 1, leaving a space between the end of said conduit, and the oscillating bar O, less than the diameter of the coin to be inserted in said conduit.

$p'$ is a nickel in place or ready to be forced downward by shoulder $g^2$ which will cause bar O to oscillate and thereby set my mechanism in motion.

Q is another conduit in which the nickel drops after the operator has obtained the desired result. This conduit shown in Fig. 1, and partially in Fig. 2, projects beneath bar G adjacent to the oscillating bar O as at q and extends across frame B angularly toward the front part of said frame.

$q'$ is a stopper placed within bar G and moves up and down with said bar. The front end of said stopper projects downward below conduit P shown in Fig. 1, and intercepts the nickel within conduit Q while my mechanism is in motion.

R is a dump-box placed immediately underneath the front end of conduit Q, and held to the frame B by a vertical bar r firmly attached thereto. The lower end of said bar is bent at right angles and secured to the bottom plate of frame B as plainly shown in Figs. 1, and 2, and partly in Fig. 3. The front part of said box is partly cut away as plainly shown in Figs. 1, 2, 4, 5, and 6, and comes close to the inner side of box A shown only in Fig. 3, immediately opposite a glass aperture $r'$ made through said frame, shown in Fig. 7. The object of said aperture is to show to the public the contents of box R and will be more fully described hereinafter. This box R is provided with a movable bottom $r^2$ as shown particularly in Fig. 6, and partly in Figs. 1, 2, 4, and 5 which rests upon a crank shaft S extending through the frame of box R beneath its bottom to which the latter is secured in such manner as to permit a dumping motion when required. The rear end of said shaft extends outwardly from box R, and may be bent at right angles, and a weight s is attached thereto as shown particularly in Figs. 1, and 4 also in dotted lines in Figs. 5, and 6. The object of said weight is to carry back the bottom $r^2$ with shaft S to their normal position after obtaining the desired result.

T is a connecting arm pivoted at its lower end to the lever F shown in Figs. 1, 2, and 5, in such manner as to permit an oscillating and up and down movement while said lever is in operation. The upper end of said arm is slotted as at t as shown in Figs. 2, 5, and 6, and in dotted lines in Figs. 1, and 4, into which the end of crank shaft S works freely. This slot t is made long enough to permit lever F, and connecting arm T when in operation to go down a certain distance before the power is transmitted to the crank shaft S.

U is an indicator plate, upon the front side of said plate a piece of paper is fastened on which the words "Empty" and "Full" are printed as fully illustrated in Fig. 2, and partly in Fig. 7, to indicate whether the machine is empty, or full of prepared goods. This plate comes close to the inner side of box A as plainly shown in Fig. 3, and registers with a glass aperture u cut through said box for the purpose of showing to the public the required word.

$u'$ is a lever to the front end of which the plate U is firmly secured—while the other end is pivoted to post $h'$ secured to frame B as shown in Figs. 1, and 2, in such manner as to permit a vertical oscillating movement to said lever $u'$. At a short distance from the rear end of said lever, is a connecting rod $u^2$ pivoted thereto so as to permit a vertical oscillating and up and down movement to said rod when in operation, the lower end of which extends downward to or near the bottom plate of frame B and pivoted likewise to an additional lever V which may be placed parallel to lever $u'$ near the bottom of frame B, and pivoted to a post v secured to said frame, and project outwardly about as far as the post $h'$ of lever $u'$, so as to keep the connecting bar $u^2$ out of the way to the different parts of my mechanism. The front end of this corresponding lever V projects inwardly at right angles near the front part of frame B as at $v'$ and plainly shown in Fig. 1, and partly in Figs. 2, and 3, so as to be immediately underneath the bottom of the sliding board or box C—the object of which will be hereinafter described.

$v^2$ is a regulator shown only in Fig. 1, to keep lever V with connecting rod $u^2$ and parallel lever $u'$ in proper position.

x is a spring the upper end of which is attached to post $h'$ or to the frame B if desired. The lower end is attached to the connecting rod $u^2$ shown only in Fig. 1, so as to draw constantly said connecting rod with the two parallel levers $u'$, and V to their normal position, and to permit a reciprocating motion to said levers.

$y$ is a stationary box or funnel shown only in Fig. 3 and used for conveying prepared goods out of frame B, and box A from the receptacle $b'$ when my mechanism is in operation. The side of this funnel is attached to the frame B close to the sliding board or box C while the front extends outwardly leaving a space for the purpose above mentioned. The lower end of said funnel projects outside of box A through the aperture $y'$ shown in Figs. 3, and 7.

$w$ is a receiving plate where the operator receives his goods.

When all the different parts of my invention are in position, and prepared goods in their proper place within the apparatus the word "Full" will appear within the glass aperture $u$ shown in Fig. 7, and indicate that my machine is ready for operation. Then any one desiring some stamped stationery which may have been placed within the receptacles $b'$, will obtain them by putting a nickel in the slot $p$ shown in Fig. 7. The nickel will undoubtedly roll or slide downward within the inclined conduit P toward bar G then follow the conduit or drop almost vertically along side of said bar to the bottom of conduit P where it will roll beneath the bar G, below shoulder $g^2$, to the interlocking bar O as plainly shown in Fig. 1; while the nickel rests in this place the operator may push downward lever F, and cause bar G which is pivoted thereto to slide also downward, meanwhile the shoulder $g^2$ which forms part of bar G will force the nickel to slide downward within the space made between the stationary end of conduit P, and the oscillating bar O, beneath bar G. This space being less than the diameter of the nickel $p'$ it will force its way down by bar O, moving it to the right enough to clear the recess from the pin $o'$. While lever F is being pushed still farther down the pin or post $k$ secured to rod G, will strike the horizontal lever I at the notch $k'$, cut thereon, and cause the front end of said lever to move downward with its pawl J pivoted near its front end and the upper part of said pawl J being engaged with the teeth of wheel $e'$ will cause the latter to revolve, and also the shaft E, pinion $c'$, and wheel $e^2$. While this operation is going on the teeth of rack $c$ being engaged with those of pinion $c'$ as plainly shown in Figs. 2, and 3, the pinion will force said rack to slide downward with box C upon which it is attached. As soon as wheel $e'$ has revolved a certain space the post $n^2$ secured to rod G, will strike the upper edge of pawl N, and carry its front end to the toothed wheel $e^2$ which will engage with its teeth and stop entirely the forward and downward motion of the mechanism. In the same time the front end of pawl M will drop into the next tooth of wheel $e'$, and prevent the backward movement of said wheel when the operator lets go lever F.

The teeth of wheels $e'$ and $e^2$ may be made according to the size or thickness of the front, or discharge apertures of receptacles $b$ so that an aperture may be entirely uncovered, or opened, every time the sliding board or box moves down the thickness or pitch of a tooth—leaving the stamped stationery placed in said receptacle to slide down free of any obstruction whatsoever, into the funnel $y$, then out of frame A through the aperture $y'$, to the receiving plate $w$, where the operator may reach them without further operation.

As soon as the nickel has set my mechanism in motion, it will drop upon the projecting end of conduit Q beneath bar G, where the intercepting bar or stopper $q'$ which has been carried down with bar G, blockades said conduit to stop the nickel from going down into the conduit Q, while the connecting arm T pivoted to lever F, which has also been moved down with said lever, and forced the crank shaft S with bottom $r^2$, to turn half way down, and caused its contents, or former nickel to drop out of sight, into a receiving box which may be placed within frame A. The object of this box R, and its movable, or dumping bottom $r^2$ is to practically detect fraudulent operations, as the next operator, or the attendant will see immediately whether the former operator has put a bogus coin or nickel in the slot, or aperture $p$ as is often done. As soon as the operator lets go the reciprocating lever F, the spring H will carry back to their former places the bar G, with posts $k$, and $n^2$, and stopper $q'$ all of which are secured to said bar—also lever F, to which bar G is pivoted, post $o'$ or intercepting pin, supporting bar K both secured to said lever, and connecting arm T pivoted thereon. Meanwhile support K carries up lever I with its pawl J to post $k^2$, where it will stop said lever from going farther up, and spring L secured to the horizontal part of the ratchet J will cause said pawl to engage with the next tooth of wheel $e'$ as plainly shown in Fig. 1, while pawl M will prevent the backward motion of said wheel. The crank shaft S with bottom $r^2$ being free from the downward pressure of the connecting arm T will immediately return to its normal position by means of weight $s$, while the nickel being released from the intercepting bar $q'$ will roll down within conduit Q toward the dump box R where it will drop in and rest upon bottom $r^2$ until further operation. Pin $n^2$, being out of the way of pawl N said pawl will fall back immediately upon post $n'$. The bar O is forced back by the pressure of the coin against the tension of the spring $o^2$ secured to the lower end of the bar O and when the coin falls into the chute Q the contraction of the spring $o^2$ will press the bar O forward against the pin $o'$ on the lever F and until the lever F is raised to its normal position when the pin $o'$ will engage the recess $o$ in said bar thereby securely locking the parts until another coin is inserted. Thus my machine will be ready for another operation, and so on until the sliding box C has been carried down, and all the receptacles are empty of their contents. While the last receptacle is being emptied the lower end of box C, will strike the projecting end $v'$ of corresponding lever V, and carry it down; the same motion is transmitted to lever $u'$ and the indicator plate U by means of connecting rod $u^2$, and the printed word "Empty" will take the place of the word "Full" immediately opposite the aperture $u$ shown in Fig. 7, and indicate that the machine is empty of its contents.

To reload the machine, the operator or attendant may push downward the rear ends of levers M, and pawl J enough to get their front ends out of the way of toothed wheel $e'$, thereby leaving said wheel free of any obstruction—and the weight 2 placed within frame B as shown in Figs. 2, and 3 will carry up the sliding box C to its former place beneath stopper $c^3$, and cause the pinion $c$, and shaft E to revolve backward. Then the front, or discharge ends of all the shelves, or receptacles $b'$ will be closed, thereby ready to receive another load of stamped stationery. This weight 2 is used also to counterbalance the sliding box C when same is moving downward. If said weight fail to raise the box C the operator may use the lifting bar 4, which is secured to the back of box C, and extends out of frame B as plainly shown in Fig. 3, and partly in Fig. 1.

In order to prevent fraudulent operations, I place a small projection 5 within the bottom of conduit P near or immediately where the nickel drops downward as shown in dotted lines only in Fig. 1. This projection 5 is sharp enough to cut a string which may be attached to a nickel in such manner that the fraudulent operator may be able to pull it back as soon as the mechanism has been set in motion which is often done in similar machines, that have not my improvement.

It is obvious from the above description that numerous changes can be made without departing from the scope of my invention.

What I claim is—

1. In a coin controlled apparatus, the combination with the casing, of open ended receptacles secured therein, a sliding box arranged in front of said receptacles, a rack within said box, a shaft journaled within the casing, a pinion on the shaft engaging the rack, toothed wheels on one end of the shaft, pawls engaging the teeth of said wheels, a reciprocating hand lever extending to the outside of the casing for actuating the pawls, and a coin controlled lock for said lever, substantially as described.

2. In a coin controlled apparatus, the combination with the casing, of a frame within the casing, open ended receptacles secured therein, a sliding box arranged in front of the receptacles, a rack within said box, a shaft journaled on the frame, a pinion on the shaft engaging the rack, a toothed wheel on the shaft, an actuating lever, a pawl actuated by said lever engaging the toothed wheel, having an extension extending beyond the frame, a pawl engaging said wheel, pivoted to the frame and extending beyond the frame, a spring connection between said pawls, and means for returning the box to its initial position, substantially as described.

3. In a coin controlled apparatus, the combination with the casing, of a frame within the casing, open ended receptacles therein, a sliding box in front of said receptacles, a rack within said box, a shaft journaled on the frame, a pinion on the shaft engaging said rack, a toothed wheel on one end of said shaft, a reciprocating hand lever pivoted to the frame, a vertical lever pivoted to the reciprocating lever having a sliding connection with the frame, a horizontal lever pivoted to the frame adjacent to the hand lever, a pawl pivoted to said horizontal lever engaging the toothed wheel on the shaft, a pin on the hand lever, a locking bar pivoted to the frame having a recess engaging said pin, a pin on the vertical lever bearing against the horizontal lever, and means for moving the locking bar out of engagement with the hand lever, substantially as described.

4. In a coin controlled apparatus, the combination with the casing, of a frame within the casing, open ended receptacles therein, a sliding box in front of said receptacles, a rack within said box, a shaft journaled on the frame, a pinion on the shaft engaging said rack, a toothed wheel on the shaft, a reciprocating hand lever pivoted to the frame, a pin on the hand lever, a horizontal lever pivoted to the frame adjacent to the hand lever, a vertical lever pivoted to the hand lever and having a sliding connection with the frame, a pin on said vertical lever bearing against the horizontal lever, a coin conduit, a shoulder formed on the vertical lever at and above the end of the coin conduit, a locking bar pivoted to the frame adjacent to the vertical lever against which the coin abuts, forming a coin chute between the bar and the lower end of the coin conduit less than the diameter of the coin, and having a recess at its lower end normally engaging the pin on the hand lever, and a pawl pivoted to the horizontal lever engaging the toothed wheel on the shaft, substantially as described.

5. In a coin controlled apparatus, the combination with the casing, having an aperture in its face, a frame within the casing, open ended receptacles therein, a box sliding in front of said receptacles, a lever pivoted to the frame having an indicator at its end registering with the aperture in the casing, a lever pivoted to the lower part of the frame having one end projecting in the path of the sliding box, a vertical lever connecting the lower and indicator lever, and means for returning the indicator to its initial position, substantially as described.

6. In a coin controlled apparatus, the combination with a storage compartment, of a slide in front of the same, means for forcibly moving the slide, a hand lever or actuating said means, a coin chute, a locking bar for the lever extending beyond the end of the chute, and against which the coin rests, and an extension on the lever engaging the coin to move the locking bar out of engagement with the lever, substantially as described.

7. An automatic machine for the purpose of delivering prepared goods composed of a series of receptacles having their both ends cut away, a movable box or board provided with guides, and a counter weight, placed near, or close to the front ends of said receptacles for the purpose of closing the front apertures of each receptacle—a rack placed within said board, or box, and firmly secured thereto—a pinion provided with a shaft and bearings, its teeth being engaged with those of the rack, a toothed wheel firmly secured to said shaft—for the purpose of moving said board or box, when required, a pawl having a spring, and engaged with the teeth of said wheel for preventing backward motion, a reciprocating lever provided with a pawl pivoted thereto, and engaged with the teeth of said wheel, substantially as set forth, and for the purpose specified.

8. An automatic machine for the purpose of delivering prepared goods composed of a series of receptacles, having their both ends cut away a movable box or board provided with guides, and a counter weight, said box placed near or close to the front ends of said receptacles for the purpose of closing the front apertures of each receptacle—a rack placed within said board or box, and firmly secured thereto—a pinion provided with a shaft and bearing, its teeth engaged with those of the rack, a toothed wheel firmly secured to said shaft for the purpose of moving said board or box when required—a pawl provided with a spring, and engaged with the teeth of said wheel for preventing backward motion, a reciprocating lever provided with a pawl pivoted thereto, and engaged with the teeth of said wheel for the purpose described, an additional wheel toothed in opposite direction, and firmly secured to said shaft—a pawl provided with a counter weight, and engaged with the teeth of said additional wheel, while the ratchet wheel is being revolved, and thus preventing said ratchet wheel from revolving more than required at each operation, substantially as set forth, and for the purpose described.

9. An automatic machine for the purpose of delivering prepared goods composed of a series of receptacles, having their both ends cut away, a movable box or board provided with guides, and a counter weight, said box placed near or close to the front ends of said receptacles for the purpose of closing the front apertures of each receptacle, a rack placed within said board, or box, and firmly secured thereto, a pinion provided with a shaft and bearing, its teeth engaged with those of the rack, a toothed wheel firmly secured to said shaft for the purpose of moving said board, or box when required, a pawl provided with a spring, and engaged with the teeth of said wheel for preventing backward motion, a reciprocating lever, provided with a pawl pivoted thereto, and engaged with the teeth of said wheel for the purpose described—an additional wheel toothed in opposite direction, and firmly secured to said shaft—a pawl provided with counter weight, and engaged with the teeth of said additional wheel, while the ratchet wheel is being revolved and prevent said ratchet wheel from revolving more than required at each operation, for the purpose specified, a nickel conduit, and a connecting bar provided with guides, and a shoulder as described; said bar placed immediately opposite the rear end of the nickel conduit, and pivoted to the reciprocating lever, and adapted to move freely up and down with said lever, a spring to keep said bar and the lever in position—an interlocking bar provided with a spring and pivoted near said connecting bar, said interlocking bar having a rectangular cut thereon—a pin or post secured to the reciprocating lever and working within said cut for the purpose of locking the above mechanism substantially as set forth, and for the purpose described.

10. An automatic machine for the purpose of delivering prepared goods, having a reciprocating lever, a connecting bar pivoted to said lever in such manner as to slide up and down freely with said lever when required, and both being provided with springs, and guides to keep them in position, a shoulder made within said connecting bar, and forming part thereof for the purpose described, an interlocking bar placed near said connecting bar, and provided with a spring, a rectangular cut or recess made upon said bar, a post secured to the reciprocating lever, and work within said recess for the purpose specified, a nickel conduit the rear end of which comes close to the connecting bar, and projecting downward below the shoulder, and toward the interlocking bar, leaving a space less than the diameter of the nickel for the purpose described, an additional conduit placed below, the former for the purpose of conveying the nickel to a box receiver, said box receiver being partly cut away to correspond to a glass aperture, for the purpose described, and provided with a movable bottom, and means to keep said box in position—a crank shaft attached loosely to said box, and upon which said movable bottom rests, a connecting arm one end of which is pivoted to the reciprocating lever while the other is attached to the crank shaft for the purpose of carrying down said shaft when the reciprocating lever is being pushed downward—a weight placed at the farther end of said crank shaft substantially as set forth, and for the purpose described.

11. An automatic machine for the purpose of delivering prepared goods, having a reciprocating lever F, a nickel conduit Q, an intercepting bar $q'$, a box receiver R partly cut away to correspond to a glass aperture, and provided with a dumping bottom and means to move said bottom, a crank shaft S, and a connecting arm T substantially as set forth, and for the purpose described.

12. An automatic machine for the purpose of delivering prepared goods, having a reciprocating lever—a box receiver partly cut away and provided with a dumping bottom, a glass aperture corresponding to said box for the purpose described—a crank shaft attached loosely to said box, and upon which the bottom rests, and a connecting arm pivoted to the reciprocating lever and having a sliding connection with the crank shaft, substantially as described.

13. An automatic machine for the purpose of delivering prepared goods, having a reciprocating lever F, an interlocking bar O, provided with a spring, and recess made thereon, a pin or post secured to the reciprocating lever F working within said recess, a connecting bar G, provided with a spring, and guides—and pivoted to lever F, a shoulder $g^2$ made upon said bar,—conduit P, and the additional conduit Q—, an intercepting bar $q'$, a box receiver partly cut away provided with a movable bottom $r^2$, crank shaft S, having weight s, and connecting arm T, the glass aperture corresponding to said box; all these several parts being constructed, combined, and operating substantially as set forth, and for the purpose specified.

In testimony whereof I have hereunto affixed my signature in presence of witnesses.

ADELARD F. MARTEL. [L. S.]

In presence of—
M. ROSENFELD,
E. B. STONEHILL.